United States Patent

[11] 3,543,719

| [72] | Inventor | Philip C. Pettyjohn<br>Marietta, Georgia |
|---|---|---|
| [21] | Appl. No. | 719,950 |
| [22] | Filed | April 9, 1968 |
| [45] | Patented | Dec. 1, 1970 |
| [73] | Assignee | Lockheed Aircraft Corporation<br>Burbank, California |

[54] SEALANT APPLYING TOOL
5 Claims, 3 Drawing Figs.

[52] U.S. Cl. ................................................ 118/410,
141/383
[51] Int. Cl. .............................................. B05c 1/00
[50] Field of Search .......................................... 18/3.5,
30(E), 30(UM); 29/401, 402; 117/2; 118/410,
411, 415; 141/311, 326, 327, 367, 383, 392;
144/310; 156/94, 98; 244/131(U.S. only), 132;
264/36; 184/38(Cursory)

[56] References Cited
UNITED STATES PATENTS

| 1,787,770 | 1/1931 | Zerk | 184/38X |
|---|---|---|---|
| 2,408,450 | 10/1946 | Schrader | 29/401(UX) |
| 3,102,829 | 9/1963 | Rathbun | 118/410 |

Primary Examiner—Laverne D. Geiger
Assistant Examiner—Edward J. Earls
Attorneys—John J. Sullivan and George C. Sullivan ABSTRACT: A sealant applying tool consists of a fixture bar with attached rubber suction cups which allow it to be firmly affixed in any position on an aircraft wing area to be repaired. Attached to the fixture bar is a pressure vessel which contains the sealant to be used and a pressure bolt that passes through the center of the vessel with a washer at its end to give a piston ring seal effect. As the pressure bolt is threaded into the vessel the sealant is forced under pressure up, into and around the leaking fastener thus effecting a permanent seal. Lock bolts are threaded in the fixture bar one on each side of each pressure bolt mounting hole to adjust the pressure vessel to any required height and to force it against the wing surface locking it in position at the repair area.

Patented Dec. 1, 1970 3,543,719
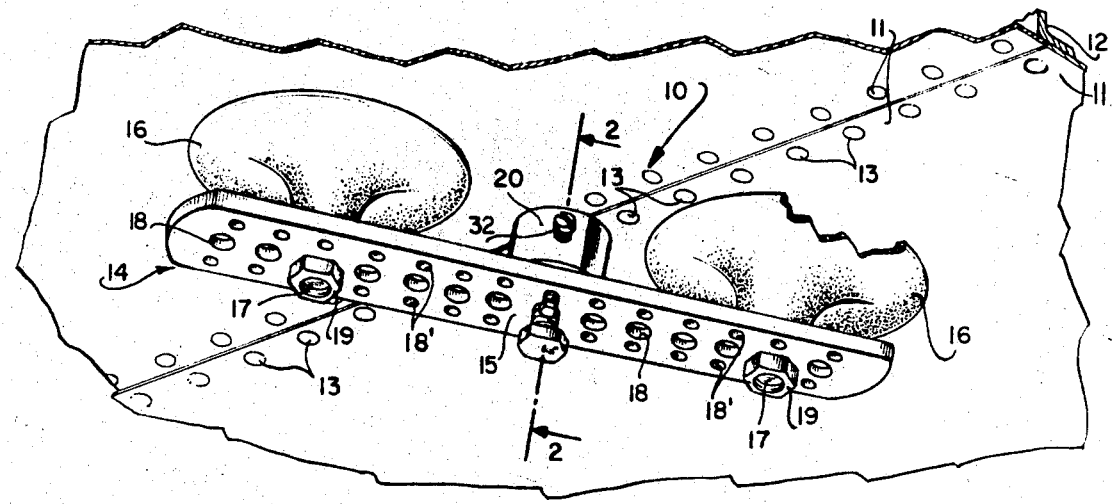
FIG_1
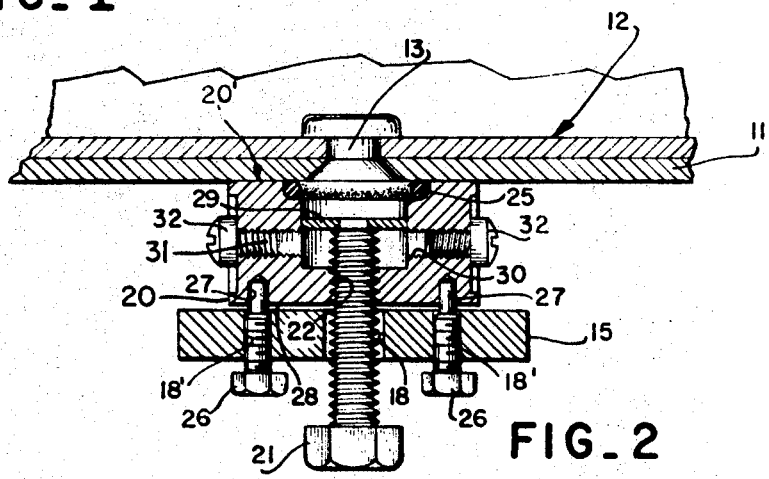
FIG_2
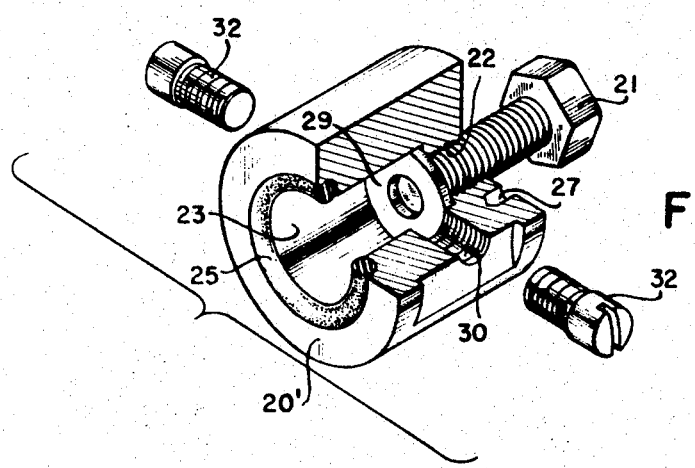
FIG_3
INVENTOR.
PHILIP C. PETTYJOHN
BY George C. Sullivan, Agent
John L. Sullivan
Attorney

SEALANT APPLYING TOOL

This invention relates to techniques in the application of sealant to surfaces of assembled parts to produce fluidtight joints and more particularly to a tool for such sealant application that is characterized by its portability and uncomplicated design, construction and operating parts and yet is reliable, offering especial utility in repairing leaks in liquid containers, notably the integral fuel tanks of aircraft from the outside.

In integral fuel tanks of aircraft the wall of the tank is the external covering skin of the aircraft and necessarily is formed by multiple panels or sheets which are brought together in substantially edge-to-edge abutment and secured usually by rivets to underlying ribs or similar framework. It is at and along these abutting edges and around the rivets or other fasteners that leaks are prone to develop, particularly on the under or lower surfaces of the aircraft component.

Often external repairs are of a temporary nature, but in many cases permanent repairs can be satisfactorily accomplished externally. The alternative to external repairs, i.e., draining the tank, dismantling or partially dismantling the assembly to gain access to the interior of the tank, and subsequent reassembly after the repair has been made, is highly objectionable and every effort is and has been made to avoid this. At he same time, it is imperative that every leak repair be performed properly the first time, because improper procedures and techniques can result in repeated leaks from the same source or they may result in costly structural repairs.

In order to accomplish an acceptable external repair, it has been found that the sealant must be injected under force into the crevice or area and completely fill and seal it. To this end, bulky and elaborate apparatus and tools have been employed, complicated in large measure by the requirement for an airtight seal around the work area to assure the direction of the forced or pressurized sealant into the crevices or between the faying surfaces of the adjoining parts. Thus, while the design and construction of the pressure vessel to contain the sealant in the repair area has imposed relatively little trouble, maintaining such a pressure vessel in an immovable position during the operation including the time required for the sealant to set or cure has imposed problems that have not as yet been satisfactorily solved.

Special adhesives have been developed for this purpose, but none have proven successful because of the forces and pressures required to inject the sealant and the fact that the attachment is only temporary and must be eventually removed without damage to the structure. In addition, in order to perfect the attachment during the complete operation, special surface preparation must be made, and all in all the process is time consuming and costly.

The most reliable apparatus heretofore used has been a jack adapted to be positioned between the pressure vessel and fixed or stationary adjacent structure which is usually the aircraft supporting surface, i.e., the ground, runway, hanger floor, etc., since most leaks occur on the undersurfaces of the aircraft. When the pressure vessel is properly located, and air jet or some other suitable pressure is applied to the sealant in the vessel forcing it into the crevice or leak area. Such a rig, while it does the job well, leaves much to be desired, principally in the setup and knockdown time required and the complexity of the apparatus.

The present invention proposes substantial improvements in the leak repair art as above generally described, contemplating a portable, self-contained tool as opposed to an apparatus which must be assembled and disassembled with each operation. This tool is composed of a minimum of relatively movable and comparatively delicate and/or sensitive parts so that it has good wearability qualities and requires little or no maintenance. At the same time its design and construction is such as to lend itself to relatively inaccessible and hard to get at places because of adjacent structure, contour or curvature of the skin surface, etc., where leak repair may be needed.

More specifically, the tool herein proposed comprises a supporting plate that is preferably oblong in configuration and provided with multiple attachments for the connection in various selected positions of a negative pressure or suction source by which the plate is immovably secured to the aircraft skin adjacent the area to be sealed. The plate further includes at least one mounting attachment for a pressure vessel in which the sealant is adapted to be loaded. An adjustment is provided between the pressure vessel and the plate to move the former laterally with respect to the latter so that a predetermined pressure can be applied on the vessel to locate its outer surface in flush contact with the skin immediately adjoining the area to be sealed A seal of relatively flexible, resilient material defines the peripheral surface of the pressure vessel surrounding the sealant port so as to contain at all times the sealant and at the same time allow some limited angular movement of the pressure vessel with respect to its longitudinal centerline. This permits an adaption of the surface of the pressure vessel to a contoured surface of the part to be sealed. When thus positioned, a plunger carried by the plate and pressure vessel permits the forced injection of the sealant from the vessel into the leak area.

With the above and other objects in view as will be apparent, this invention consists in the construction, combination, and arrangement of parts all as hereinafter more fully described, claimed, and illustrated in the accompanying drawings wherein:

FIG. 1 is an isometric view of a sealant applying tool constructed in accordance with the teachings hereof shown as applied to the skin of an aircraft to illustrate the disposition of the pressure vessel located with respect to a fastener around which a fuel leak has been detected and which it is intended to seal;

FIG. 2 is a transverse section of the tool taken along the line 2–2 of FIG. 1 to show the relationship of the several parts and the adjustable features of the pressure vessel by which it is disposed and held in intimate and airtight engagement against the aircraft skin around the fastener to be sealed thereby; and FIG. 3 is an isometric view of the pressure vessel alone with a longitudinal section therein to show primarily the central sealant chamber and the manually operated plunger associated therewith and the external sealant ring to contain the sealant within the leak area while it is being injected.

With references more particularly had to the drawings, 10 designates a fragment of an aircraft component in the area of abutting skins 11 secured to underlying supporting structure 12 by means of a plurality of rivets 13. When a leak is detected around one of the rivets, for example, and it is desired to seal or plug such leak externally of the aircraft, a tool 14 as herein proposed is secured in position relative to the defective or leaking rivet 13.

To this end the tool 14 consists of a plate or rigid supporting member 15 to which a pair of rubber suction cups 16 are removably mounted through a threaded stud 17 carried by each such cup 16 and passing through a primary hole 18 provided therefor in the plate 15. A suitable number of such primary holes 18 is provided in the plate 15 located relative to each other to permit virtually unlimited adjustment of the relative position of the cups 16 which, when located, are secured by a nut 19 tightened on the outer end of its stud 17. Pressure applied to the plate 15 with the suction cups 16 in contact with the surface of the skin 11 causes an adhesion of the cups 16 to the skin 11 in the conventional manner.

A pressure vessel 20 is also removably mounted on the plate 15 through a bolt 21 to project therefrom in the same direction as the suction cups 16. The bolt 21 is of a size allowing it to pass freely through the same holes 18 whereby the position of the pressure vessel 20 on the plate may be varied in the same manner as the cups 16. The end of the bolt 21 is threaded into a center bore 22 in the pressure vessel 20 which opens into a sealant chamber 23 which in turn opens on the opposite face 20' of the vessel 20. When properly secured in position by the suction cup 16, the face 20' is adapted to be located with the chamber 23 substantially concentric about the head of the rivet 13 to be sealed.

In order to ensure an airtight sealing of the chamber 23 thus located about the rivet 13, the defining edge of chamber 23 is grooved to receive and retain a conventional O-ring 25 which is press fitted therein with its peripheral surface normally extending slightly beyond the adjacent surface 20'. Lateral movement of the pressure vessel 20 with respect to the plate 15 is effected by means of a pair of setscrews 26, one threadably mounted in a secondary opening as indicated at 18' (FIG. 2) in the plate 15 on each side of the bolt 21 and operative at its end in a recess 27 provided therefor in the vessel 20. As the setscrews 26 are tightened in the plate 15 the vessel 20 is forced outwardly thereof as indicated by the space 28 into intimate and sealing engagement through O-ring 25 with the skin 11 and firmly secured there by the resisting pressure of the suction cups 16. Threaded openings 18' are associated with each opening 18 to permit such lateral adjustment in each position of the vessel 20 as described.

In addition to mounting the pressure vessel 20, the bolt 21 also serves as a mechanical plunger to inject the sealant omitted to avoid confusion when the tool 14 is appropriately mounted as above described on the aircraft skin 11. This is facilitated by a washer 29 or its equivalent placed in the base of the chamber 23 in contact at its center with the end of the bolt 21 prior to filling the chamber with the sealant. During sealant injection, the bolt 21 is tightened to thereby force the washer 29 to the open end of the chamber 23 at the vessel surface 20', and the sealant ahead of it against the head of the rivet 13 and into the voids or crevices between the rivet, the skin 11, and support 12.

While the sealant may be loaded into the chamber 23 prior to mounting of the tool 14 into operative position, it is preferred, in some cases, that this be done after such mounting and immediately before the injection. To permit this a sealant insertion port 30 and, if desired, a sealant bleed port 31 is provided in the pressure vessel 20. For all intents and purposes these ports 30 and 31 are identical, each constituting a threaded bore that pierces the side wall of the vessel 20. A sealant injection device or gun (not shown) may thereby be employed to fill the chamber 23 through the injection port. Where the bleed port 31 is provided, a visual determination can more readily be made that the chamber 23 is in fact filled with sealant. In any case when filled the port or ports 30 and 31 are closed by a machine screw 32. The plunger or washer 29 is now in a condition to be operated by an application of torque to the bolt 21.

Although shown and described in what is believed to be the most practical and preferred embodiment, it is apparent that departures from the specific structures illustrated will suggest themselves to those skilled in the art and may be made without departing from the spirit and scope of the invention. This invention, therefore, is not to be restricted to the particular forms of construction illustrated and described, but is intended to encompass all modifications and variations that may fall within the scope of the appended claims.

I claim:
1. A sealant applying tool comprising:
   a rigid plate;
   a plurality of primary holes piercing said plate;
   at least one negative pressure source adapted to be removably mounted in any selected one of said primary holes;
   a pressure vessel having a central chamber opening on one face thereof and a threaded bore in the base of said chamber opening on the other face thereof;
   a threaded bolt adapted to pass freely through each of said primary holes and complemental to for coaction with said threaded bore with said other pressure vessel face located adjacent said plate;
   a disc having a transverse dimension substantially equal to that of said chamber and normally seated in the base of said chamber for contact with the end of said threaded bolt whereby tightening of the bolt in the pressure vessel forces the disc outwardly of said chamber;
   a seal of resilient material associated with said one face of the pressure vessel and defining said chamber; and
   at least one threaded secondary hole piercing said plate adjacent each said primary hole therein adapted to receive a screw with the head of said screw disposed adjacent the plate in opposition to each negative pressure source whereby tightening of each said screw forces the pressure vessel outwardly of said plate in the direction of each negative pressure source.

2. The sealant applying tool of claim 1 wherein each said negative pressure source is a rubber suction cup with a projecting stud for mounting it in the selected primary hole as aforesaid.

3. The sealant applying tool of claim 1 including a sealant injection port piercing the wall of said pressure vessel and communicating with said chamber, and a closure for said port.

4. The sealant applying tool of claim 3 including a venting and inspection port piercing the wall of said pressure vessel and communicating with said chamber, and a closure for said venting and inspection port.

5. The sealant applying tool of claim 1 including a recess complemental to the end of each said screw in said other face of the pressure vessel in alinement with each said threaded secondary hole when said bolt pierces the associated primary hole as aforesaid.